United States Patent [19]

Fair et al.

[11] Patent Number: 4,492,285
[45] Date of Patent: Jan. 8, 1985

[54] MOBILE HIGH FREQUENCY VIBRATOR SYSTEM

[75] Inventors: Delbert W. Fair; Paul L. Buller, both of Ponca City, Okla.

[73] Assignee: Conoco Inc., Ponca City, Okla.

[21] Appl. No.: 270,536
[22] PCT Filed: Aug. 13, 1979
[86] PCT No.: PCT/US79/00603
§ 371 Date: Apr. 13, 1981
§ 102(e) Date: Feb. 24, 1981
[87] PCT Pub. No.: WO81/00459
PCT Pub. Date: Feb. 19, 1981
[51] Int. Cl.³ .............................................. G01V 1/09
[52] U.S. Cl. .................................... 181/114; 181/401; 367/189
[58] Field of Search ............... 181/113, 114, 121, 401, 181/119, 111; 367/189, 190

[56] References Cited

U.S. PATENT DOCUMENTS

| | | | |
|---|---|---|---|
| 3,106,982 | 10/1963 | Wade | 181/108 |
| 3,717,217 | 2/1973 | Muecke et al. | 181/114 |
| 3,777,843 | 12/1973 | Fair et al. | 181/114 |
| 3,929,206 | 12/1975 | Bedenbender et al. | 181/113 |
| 3,983,957 | 10/1976 | Silverman | 181/121 |

OTHER PUBLICATIONS

Litton Resources Flyer "Articulated Hydrostatic Vehicles" 1976.

Primary Examiner—Maynard R. Wilbur
Assistant Examiner—K. R. Kaiser
Attorney, Agent, or Firm—William J. Miller

[57] ABSTRACT

A carrier mounted seismic vibrator system that is primarily adapted for generation of high force, high frequency seismic energy into an earth medium. The apparatus includes first and second vibrators (12F and R) as supported by first and second lift systems (28F and R) disposed in tandem juxtaposition generally centrally in said vehicle (10), and the lift systems (28F and R) are designed to maintain equal hold-down force on the vibrator coupling baseplates (32F and R) without exceeding the weight of the carrier vehicle. The juxtaposed vibrators are then energized in synchronized relationship to propagate increased amounts of higher frequency seismic energy into an earth medium.

12 Claims, 5 Drawing Figures

MOBILE HIGH FREQUENCY VIBRATOR SYSTEM

DESCRIPTION

Background of the Invention

1. Field of the Invention

The invention relates generally to seismic energy vibrators and, more particularly, but not by way of limitation, it relates to an improved form of vibrator system carried by a vehicle and capable of high frequency, high force input of seismic energy to the earth medium.

2. Description of the Prior Art

The prior art, of course, includes numerous types of carrier-mounted seismic vibrators which have generally taken the form of single vibrator units either center-mounted or carried across the vehicle rear end structure. U.S. Pat. No. 3,777,843 is of interest in that it discloses a dual seismic vibrator system that is center-mounted on the carrier vehicle with the vibrators carried in laterally aligned manner utilizing a single baseplate and a single lift system for engagement control. Another patent of interest is that to Silverman, U.S. Pat. No. 3,983,957, wherein dual, tandem seismic vibrators are utilized on a carrier member; however, this teaching diverges greatly from the general vibrator construction in that the carrier vehicle itself is utilized as a single reaction mass for the two seismic vibrators. Finally, a patent in the name of Meucke et al., U.S. Pat. No. 3,717,217, discloses two individually controllable seismic vibrators carried from a tracked vehicle. This teaching is directed to a mechanism mounted front and rear of the tracked vehicle which enables control and placement of the hydraulic vibrators either in front of or behind the vehicle.

SUMMARY OF THE INVENTION

The present invention contemplates a seismic vibrator system wherein dual vibrator units are carried in tandem and center-mounted on a carrier vehicle while utilizing separate vibrator lift systems and specialized carrier weight or loading control in order to achieve greater force of higher frequency input energy to the earth medium. The vibrator units are a type capable of high frequency vibration and are disposed in tandem juxtaposition on the carrier as controlled for placement by individual lift systems including vibration isolation structure and earth-coupling baseplates. Hydraulic control of the individual lift systems is maintained through a pressure regulator valve that sets a maximum lift force that is pre-adjusted at a value less than the dead weight of the carrier. Each vibrator unit is individually controlled by a separate servo valve and separate electronic control circuit, which are driven in synchronism with a common sweep control signal, as preselected.

DETAILED DESCRIPTION

Figure 1:
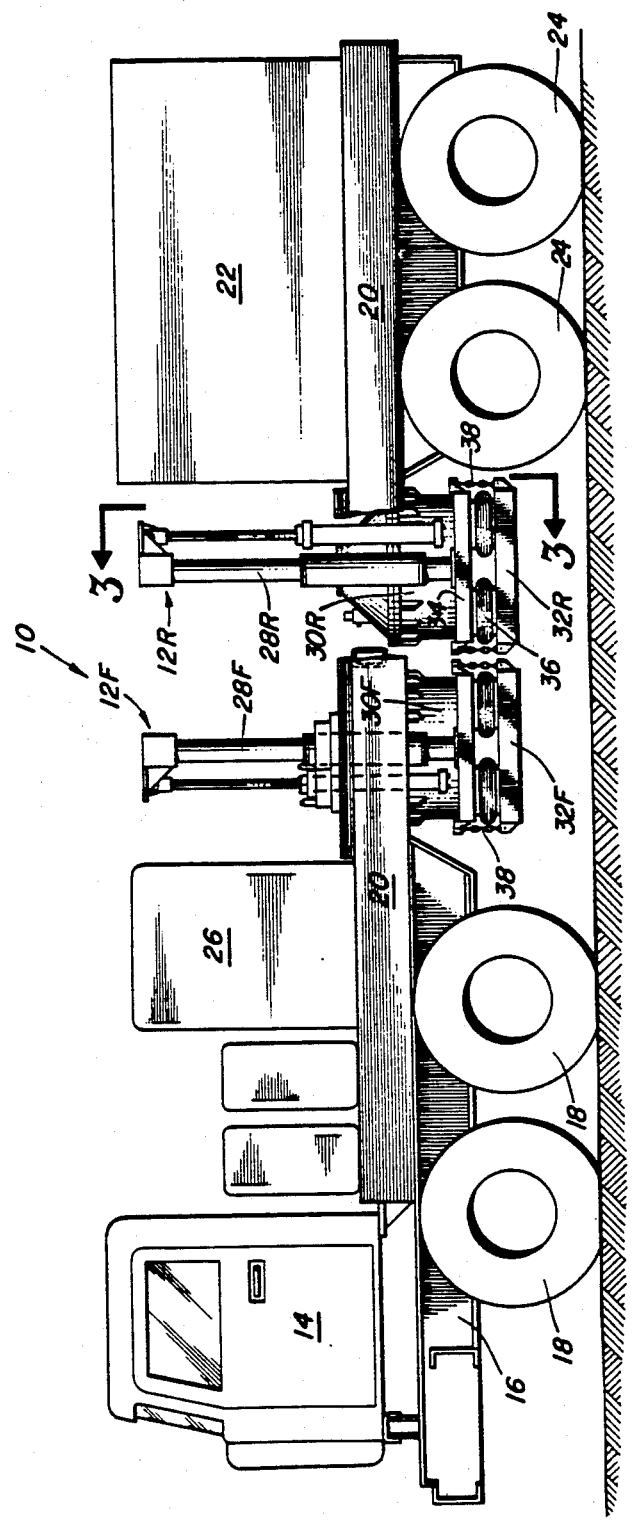
FIG. 1 is a side elevation showing the carrier-mounted vibrators in accordance with the present invention.

Referring to FIG. 1, a heavy-duty carrier vibrator vehicle 10 is constructed to carry, in tandem and center-mounted, a first vibrator assembly 12F and a second vibrator assembly 12R. The vehicle 10 may be a heavy-duty truck (as shown), a Crane Company vehicle, or it may be an off road vehicle which may or may not be articulated. Such vehicles are adaptable for various vehicle support applications. Such basic vehicle 10 includes the driving or control cab 14 as mounted on a forward wheel frame 16 and carried over forward wheels 18. A second load frame 20 is then rigidly secured on the rearward portion of front frame 16 to extend rearward terminating in support of drive engine 22 over rearwheels 24. The rearwheels 24 are a tandem drive combination while forward wheels 18 are mounted on separately steerable front axles.

An engine 26 provides power for energizing all of the associated hydraulic equipment for controlling the vibrator assemblies 12. Engine 26 in present design is a Detroit Diesel, Model 6V71. The remainder of the supporting hydraulic equipment, pumps, accumulators, etc. are all carried on the load frame 20 at most convenient mountings.

While present construction is as shown in FIG. 1, it is also contemplated that other forms of carrier vehicle and vibrator center-mounting will be utilized. That is, the increasingly selected buggy (off road) form of support vehicle may be utilized. The buggy-type vehicle is a non-highway carrier but capable of offering much greater weight and stability for hold-down purposes. Similarly, while the present contribution utilizes tandem center-mounting of vibrator units, this is only a design criterion since it is well contemplated that transverse mounting will be effective so long as center-mounted balance and necessary juxtaposition is maintained.

The vibrator assemblies 12F and 12R are of identical construction and are mounted in tandem in close juxtaposition. Each of the vibrator assemblies 12F and 12R includes a hydraulic lift assembly 28F and 28R for raising and lowering vibrators 30F and 30R as carried on baseplates 32F and 32R, the earth coupling members. As will be further described in detail, the lift assemblies 28F and 28R are each coupled via a foot member 34 and vibration isolation structure, e.g. pneumatic bags 36, to the baseplates 32F and 32R. A plurality of retaining chains 38 serve to pick up the baseplate in the lift position while limiting horizontal movement in the operational or down position.

Figure 2:
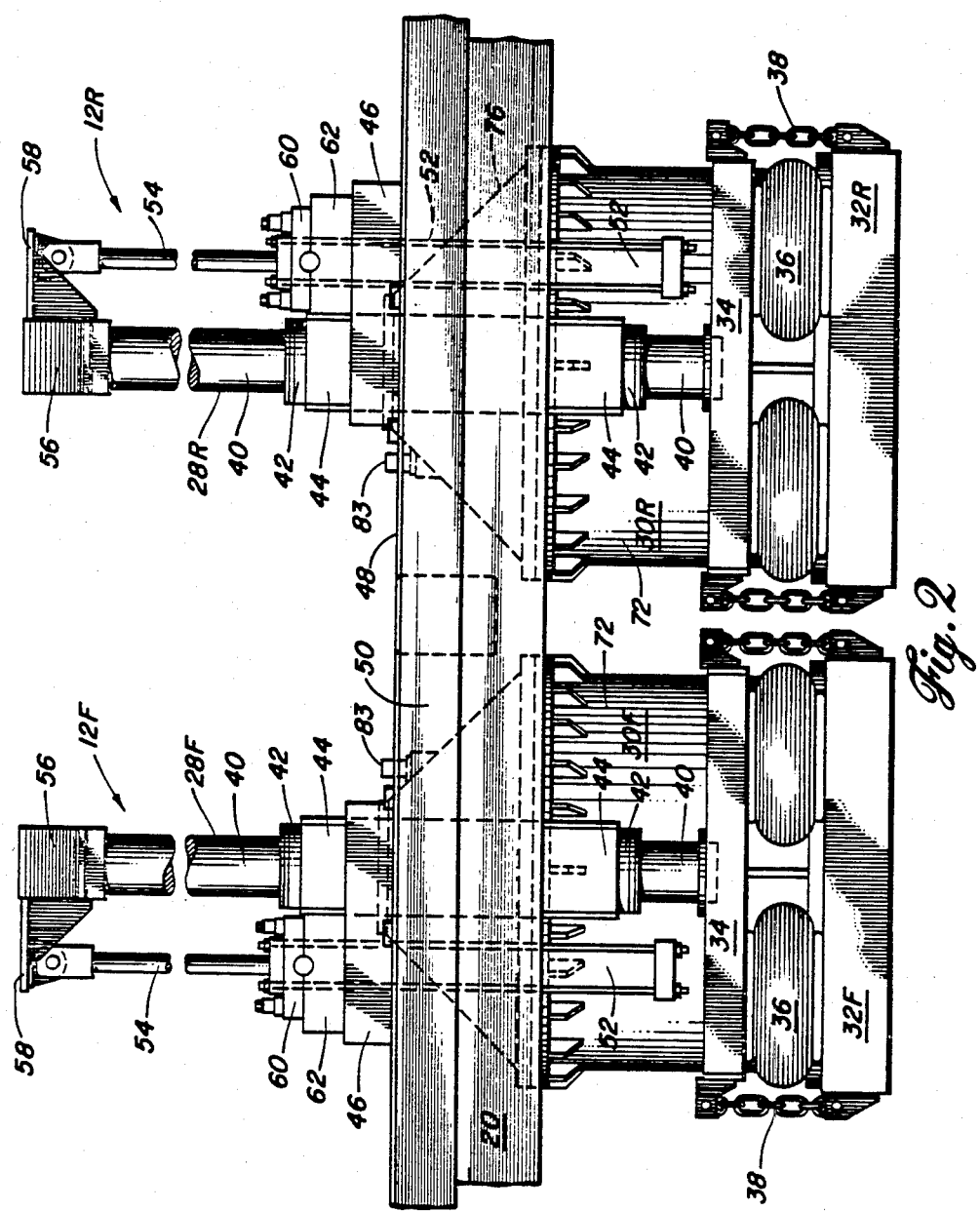
FIG. 2 is an enlarged side elevation of the vibrator assemblies of FIG. 1.

Referring now to FIG. 2, the lift assemblies 28F and 28R each consist of a guide rod 40 reciprocally disposed in bearing housing 42 as retained by a support assembly 44 and rigidly secured to load frame 20, as will be further described. Tubular support members 46 are secured on top of platform decking 48 and serve to provide rigid affixure of support assembly 44. Decking 48 of heavy gauge steel is supported across vehicle frame members 20 with lateral outboard support by tubular steel members 50 (see also FIG. 3).

The guide rods 40 extend through the lower end of bearing housing 42 into rigid affixure to foot member 34 which, in turn, is vibrationally isolated in connection through pneumatic bags 36 to the baseplate 32. The vibrator 30 (see also FIG. 3) is rigidly secured to the transverse center of baseplate 32 such that vibratory energy is transmitted through baseplate 32 into the surface of a selected earth site for propagation of seismic wave energy; while hold-down weight provided from vehicle load frame 20 through guide rod 40 to foot member 34 is vibrationally isolated. The baseplates 32F and 32R are of special design adapted for high frequency energy-coupling and are the subject of a concurrently filed application U.S. Ser. No. 270,534 filed Apr. 8, 1981 by Delbert W. Fair entitled Seismic Transducer Baseplate.

Raising and lowering of vibrator assembly 12 is accomplished hydraulically by means of hydraulic cylinder 52 and piston rod 54. An end cap 56 is rigidly secured on the upper end of guide rod 40 to extend a yoke arm 58 for pivotal attachment to piston rod 54. The hydraulic cylinder 52 is secured about its upper end by a Gimbal assembly 60 and support member 62 which are rigidly secured across support tubes 46.

Figure 3:
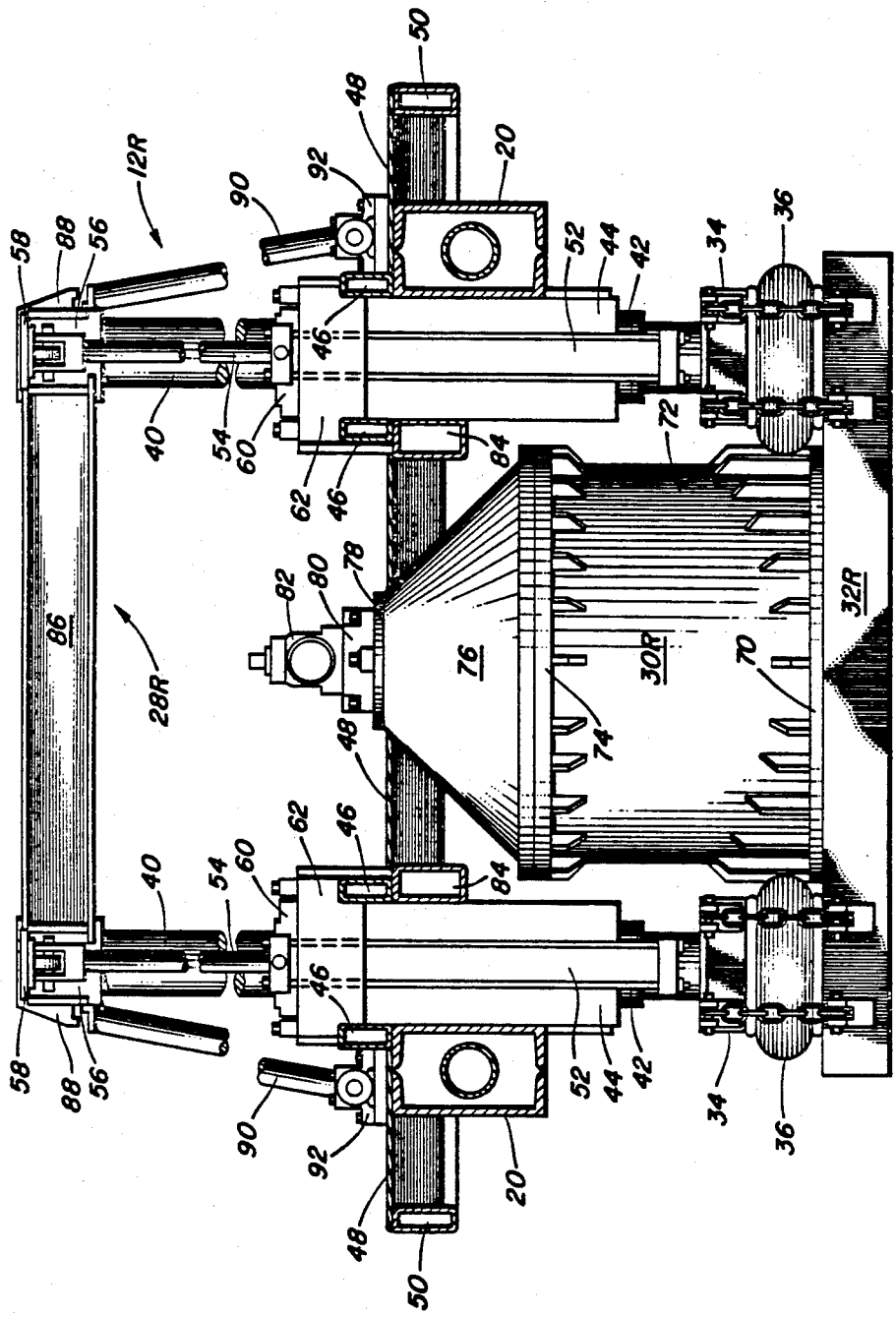
FIG. 3 is a cross-section taken along line 3—3 of FIG. 2.

Referring also to FIG. 3, the vibrator 30 is a type designed for achieving high frequencies of seismic energy input to the earth medium, the subject of a concurrently filed application. Thus, a bottom frame flange 70 rigidly secures the baseplate 32 to a cylindrical sidewall 72 having upper flange 74 for secure affixure of frusto-conical frame wall 76. The vibrator reaction mass (not specifically shown) is of similar shape, i.e. cylindrical and extending into a frusto-conical upper portion, as enclosed within the vibrator housing or frame. The double-rod-end piston for driving the baseplate 32 is then rigidly secured between baseplate 32 and an upper end plate 78 as rigidly secured across the upper periphery of frusto-conical wall section 76. The conventional hydraulic servo control is effected by means of the manifold 80 and hydraulic servo valve 82 disposed on end plate 78. Each vibrator 30F and 30R includes an LVDT 83 as mounted through frusto-conical frame wall 76 (see FIG. 2).

As can be seen in FIG. 3, a pair of support tubes 46 are weld-secured on decking 48 on each side of support cylinder 44 as interlocked beneath cylinder support member 62. A support tubing 84 of selected length is welded beneath decking 48 on the interior sides of lift assemblies 28 to provide further support strength. The upper end of each pair of guide rods 40 and their respective end caps 56 are tied together by a rigid cross frame 86 suitably secured therebetween to provide lateral rigidity. Each end cap 56 also includes a latch member 88 affixed thereon for the purpose of receiving a stiff leg 90 as movably affixed by a pivot member 92 on decking 48. Stiff leg 90 is merely a protective device to hold the lift assemblies 28F and 28R in their upward position during transport between job sites.

Figure 4:
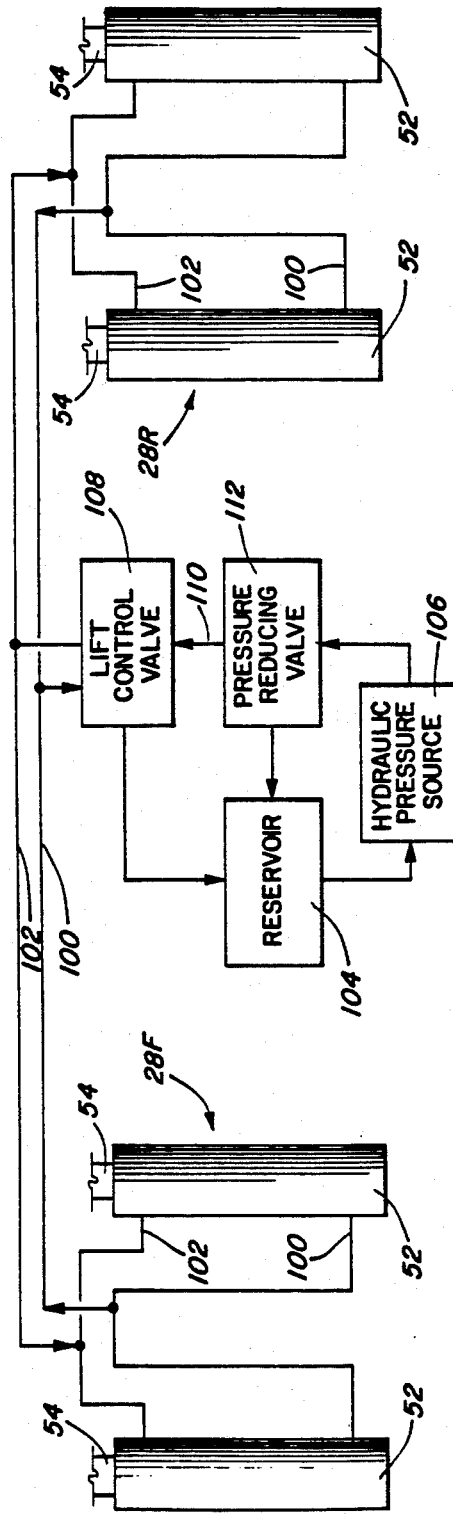
FIG. 4 is a schematic illustration of the hydraulic lift system used in the present invention.

FIG. 4 illustrates the hydraulic lift system of the present invention wherein the lift systems 28F and 28R of both the vibrators 12F and 12R are controlled from the common hydraulic source so that equal hold-down weight is supplied to both tandem baseplates 32F and 32R at all times. Hydraulic pressure control lines 100 and 102 are applied in parallel to all of front and rear hydraulic lift cylinders 52, i.e. both sides of both the front and rear lift assemblies 28F and 28R. This system utilizes the standard reservoir 104 and hydraulic pressure source 106 as controlled by a lift control valve 108. The lift control valve 108 may be any standard, commercially available type such as Racine, Model-P/N FD4-BSHS-106G-60. The lift control valve 108 is connected to the hydraulic pressure lines 100 and 102 and through a line 110 to a pressure reducing valve 112 as connected to hydraulic pressure source 106. The pressure reducing valve 112 is normally pre-adjusted for a pressure application level which prohibits the lift assemblies 28F and 28R from exerting enough force to lift the vehicle wheels off of the ground, for reasons to be further described below. The pressure reducing valve 112 may be any of various commercially available types, e.g. Racine, Type OE3-PAAH-M065.

Figure 5:
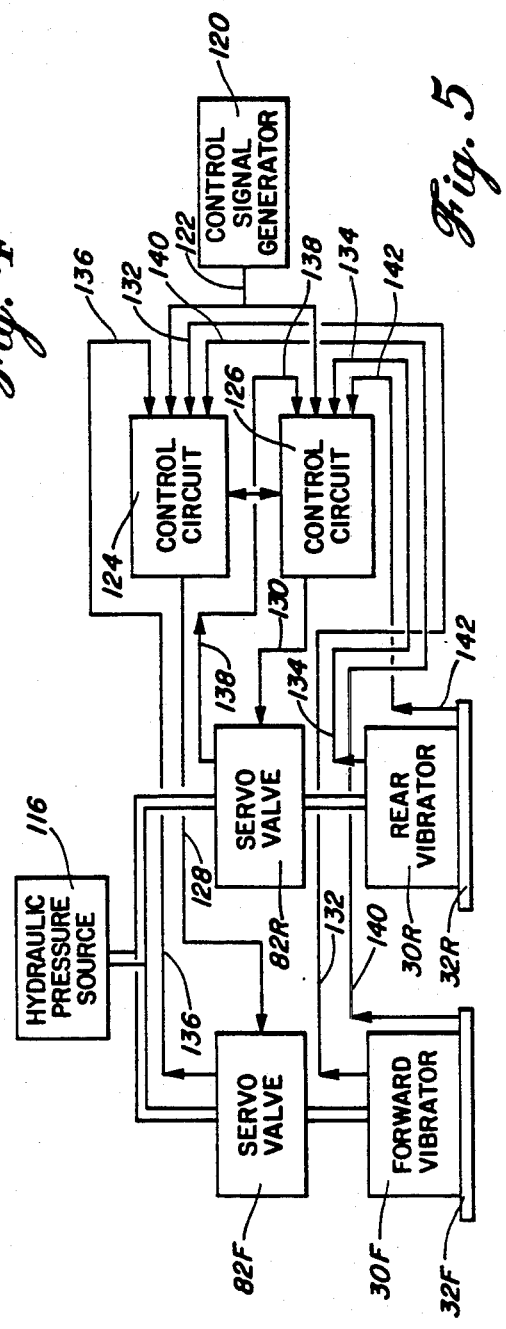
FIG. 5 is a block diagram of the hydraulic drive and control circuitry of the present invention.

Referring to FIG. 5, the forward and rear vibrators 30F and 30R are controlled in conventional manner in vibratory synchronism as fluid pressure from hydraulic pressure source 116 is applied by the respective servo valves 82F and 82R. Vibratory frequency and sweep rate originates with a control signal generator 120 which generates a selected electrical signal, i.e. selected as to frequency and rate of frequency change, either upsweep or downsweep, depending upon the exigencies of the particular shooting site and subterrain. The electrical output from control signal generator 120 is then applied via line 122 to control circuits 124 and 126 which provide the requisite output, e.g. d-c amplified control signal, on leads 128 and 130 to control the respective servo valves 82F and 82R. LVDT, Linear Velocity Differential Transformer, output is taken from forward vibrator 30F via lead 132 for input of vibrator mass position signal to control circuit 124. In like manner, LVDT output from rear vibrator 30R via lead 134 is applied as comparison input to control circuit 126. The LVDT units are a standard vibrator feedback assembly and commercially available, e.g. SCHAEVITZ LVDT Model 500HR.

In conventional manner, the control circuits 124 and 126 also utilize additional feedback indication from the servo valves and baseplates. Thus, servo valve LVDT output on leads 136 and 138 are input to the respective control circuits 124 and 126; and, vibrator feedback from baseplates 32F and 32R, as derived by accelerometers, is applied by leads 140 and 142 as further input to the respective control circuits 124 and 126.

It is the primary aim of the design of vibrator vehicle 10 to generate high force, high frequency seismic energy into the earth although the system is not limited to such high frequencies. To aid in achieving high frequencies, the vibrators 30F and 30R are designed to have special housing frames for function with a lightweight, rigid baseplate, which, along with the other system designs, eliminates hydraulic fluid compressibility breaks within the required frequency range. Thus, the vibrator system is constructed with low center of gravity and it is essential that the vibrator assemblies 12F and 12R are provided with good baseplate-earth coupling and a sufficient amount of hold-down weight.

At the selected earth site, lift assemblies 28F and 28R are actuated to place the respective vibrator baseplates 32F and 32R in contact with the ground and to place a preselected amount of vehicle weight thereover. As shown in FIG. 4, the lift control valve 108 is actuated to energize hydraulic cylinders 52 to place weight of vehicle 10 over the vibrator assemblies 12F and 12R; however, a pressure reducing valve 112 is utilized in the common source actuation to limit the amount of weight placed over the vibrator assemblies to something less than the total weight of the vehicle 10. Pressure reducing valve 112 is manually or automatically adjusted to such predetermined weight since it has been found to be essential that the front wheels 18 and rear wheels 24 of vehicle 10 remain in good traction contact with the earth surface during operation. This prohibits a situation wherein one vibrator, either vibrator assembly 12F or 12R, might be functioning in a depression so that the other vibrator assembly only would be well coupled to the earth's surface. Thus, by common actuation of the lift assemblies 28F and 28R through pressure reducing valve 112, some pre-set value less than the total weight of vehicle 10 will be applied as hold-down weight.

Thereafter, the vibrators 30F and 30R are energized in conventional manner, albeit that they are energized through separate servo valve control circuits having separate position feedback from the respective baseplates 32F and R, LVDT's 83F and R and the servo valves 82F and R (see FIG. 5). The selected control signal as output from generator 120 may be applied to each of control circuits 124 and 126 which provide a comparison with input feedback signals on leads 132 and 134, 136 and 138, and 140 and 142 such that drive output voltages on leads 128 and 130 control respective servo valves 82F and 82R to maintain vibrators 30F and 30R in phase synchronism as seismic energy is propagated into the earth medium.

The system uses two complete vibrators 30F and 30R, two lift systems 28F and 28R, and two servo valves 82F and 82R, each with its own electronic drive system as driven in synchronism from a common input control signal on lead 122. The use of two vibrators decreases the servo valve flow versus frequency requirement per servo valve to alleviate one form of limitation. Further, the lighter more rigid baseplate versus weight may be designed for a higher given force output vibrator system if two vibrators are used synchronously. In other words, better baseplate-earth coupling and a higher frequency vibrator will result from the use of multiple units in close juxtaposition as tandemly associated on vibrator vehicle 10. In addition, the use of separate lift systems 28F and 28R will provide equal hold-down weight on the multiple vibrator units. The force applied by the lift systems to raise the truck for hold-down weight is pre-set at a maximum via pressure reducing valve 112 so that the truck wheel surfaces are always kept on the ground with reserve force available. This applied hold-down force may be calculated as the lift cylinder area multiplied by the lift system pressure.

Thus, it may be seen that the seismic vibrator system of the present invention achieves desirable objects and advantages as set forth herein as well as those that are inherent. While presently preferred embodiments have been described for the purpose of this disclosure, numerous changes and modifications are included within the scope and spirit of the present invention as defined by the following claims.

The embodiments of this invention in which an exclusive property or privilege is claimed are defined as follows:

1. A carrier mounted seismic vibrator system, comprising:
   first and second vibrators including first and second vibrator baseplates disposed in juxtaposition generally centrally in said carrier;
   first and second lift means secured in juxtaposition generally centrally to said carrier;
   vibration isolation means securing said first and second vibrator baseplates to respective first and second lift means;
   a hydraulic pressure source;
   pressure reducing valve means connected to apply pressure from said hydraulic pressure source to each of said first and second lift means, said pressure reducing valve means being adjustable to apply up to a maximum pre-set hydraulic pressure to place said first and second baseplates in similar earth-coupling relationship while said carrier retains traction contact with the earth surface; and
   control means for synchronously energizing said first and second vibrators through a selected vibratory sequence.

2. A system as set forth in claim 1 wherein said first and second lift means each comprise: first and second vertical sleeve members secured to respective opposite sides of said carrier; first and second guide rod means slidingly retained within said respective first and second sleeve members; and first and second hydraulic cylinders secured between respective first and second guide rod means and said carrier and responsive to said hydraulic means to position the respective vibrators in vertical disposition.

3. A system as set forth in claim 1 wherein said vibration isolation means comprises: first resilient means secured between said first lift means and said first vibrator; and second resilient means secured between said second lift means and said second vibrator.

4. A system as set forth in claim 2 wherein said vibration isolation means comprises: first resilient means secured between said first lift means and said first vibrator; and second resilient means secured between said second lift means and said second vibrator.

5. A system as set forth in claim 3 wherein: said first and second resilient means are each comprised of a plurality of pneumatic bags.

6. A system as set forth in claim 1 wherein said first and second vibrators each comprise: a reaction mass and cylinder assembly capable of selected vibration frequencies up to at least two hundred hertz; and a high frequency baseplate secured to said cylinder assembly for earth-coupling vibratory energy.

7. A system as set forth in claim 1 wherein said first and second vibrators each comprise: a reaction mass and cylinder assembly capable of selected vibration frequencies at least twice as high as the two to one hundred hertz range; and a high frequency baseplate secured to said cylinder assembly for earth-coupling vibratory energy.

8. A system as set forth in claim 1 wherein: said first and second vibrators and respective lift systems are disposed in tandem juxtaposition on said carrier.

9. A system as set forth in claim 1 wherein said pressure reducing valve means is adjustable to supply a selected pressure where less than the carrier weight is applied over said first and second vibrators to maintain them in similar earth-coupling relationship.

10. A seismic vibrator system including a mobile carrier having motive power in combination with dual seismic vibrators, the combination comprising:
   carrier means including elongated load frame steerably supported by front and rear assemblies;
   first and second vibrators and lift means assemblies secured in juxtaposition at a central longitudinal position of said load frame for ground contact between said front and rear wheel assemblies;
   first and second base plates for earth engagement to couple vibratory energy;
   vibration isolation means resiliently connecting each of said first and second lift means to respective first and second base plates;

first and second seismic vibrators including reaction mass and frame secured centrally of said respective of first and second base plates;

hydraulic means energizable to actuate said first and second lift means to place said first and second base plates in similar earth-coupling contact while said front and rear wheel assemblies retain traction contact with the earth surface; and control means for synchronously energizing said first and second vibrators through a selected vibratory sequence.

11. A system as set forth in claim 10 which is further characterized in that: said first and second seismic vibrators are high frequency vibrators capable of vibration and energy coupling at frequencies up to two hundred and fifty hertz.

12. A system as set forth in claim 10 wherein said hydraulic means comprises: a hydraulic pressure source; and pressure reducing valve means connected to apply pressure from said hydraulic pressure source to each of said first and second lift means, said pressure reducing valve means being adjustable to apply up to a pre-set maximum hydraulic pressure.

* * * * *